P. R. GLASS.
AUTOMATIC CLENCH NAILER.
APPLICATION FILED JAN. 16, 1906.

938,474.

Patented Nov. 2, 1909.
7 SHEETS—SHEET 1.

Fig. 1

Witnesses:
Horace H. Crosman
Robert H. Kemmler

Inventor:
Perley R. Glass.
by Emery, Booth & Powell
Attys.

P. R. GLASS.
AUTOMATIC CLENCH NAILER.
APPLICATION FILED JAN. 16, 1906.

938,474.

Patented Nov. 2, 1909.
7 SHEETS—SHEET 3.

Witnesses:
Horace A. Crossman
Robert H. Kammler

Inventor:
Perley R. Glass
by Emery, Booth, & Powell
Attys.

P. R. GLASS.
AUTOMATIC CLENCH NAILER.
APPLICATION FILED JAN. 16, 1906.

938,474.

Patented Nov. 2, 1909.
7 SHEETS—SHEET 5.

Witnesses
Horace A. Crossman
Robert H. Kammler

Inventor:
Perley R. Glass.
by Emery, Booth, & Powell
Attys.

P. R. GLASS.
AUTOMATIC CLENCH NAILER.
APPLICATION FILED JAN. 16, 1906.

938,474.

Patented Nov. 2, 1909.
7 SHEETS—SHEET 6.

Witnesses:
Horace A. Crossman
Robert H. Kammler

Inventor:
Perley R. Glass.
by Emery, Booth, & Powell
Attys.

UNITED STATES PATENT OFFICE.

PERLEY R. GLASS, OF QUINCY, MASSACHUSETTS, ASSIGNOR, BY MESNE ASSIGNMENTS, TO MANUFACTURERS MACHINE COMPANY, OF MONTCLAIR, NEW JERSEY, A CORPORATION OF NEW JERSEY.

AUTOMATIC CLENCH-NAILER.

938,474.     Specification of Letters Patent.     Patented Nov. 2, 1909.

Application filed January 16, 1906. Serial No. 296,355.

*To all whom it may concern:*

Be it known that I, PERLEY R. GLASS, a citizen of the United States, residing at Quincy, in the county of Norfolk, State of Massachusetts, have invented an Improvement in Automatic Clench-Nailers, of which the following description, in connection with the accompanying drawings, is a specification, like characters on the drawings representing like parts.

My invention relates to machines for inserting metallic fastenings into leather and it is particularly though not exclusively applicable to what are known as automatic clench nailers commonly used in the manufacture of boots and shoes.

One feature of my invention is improved means for beating down and holding the sole or stock upon the horn while the nails are being driven and clenched.

My invention also comprises improved means for regulating the feeding mechanism so that the nails cut shall be of a length adapted to the thickness of the stock then on the horn.

These and other features of my invention will be best understood by reference to the following description, when taken in connection with the accompanying drawings of one embodiment of my invention selected for the purpose of illustration, while its scope will be more particularly pointed out in the appended claims.

Referring to the drawings, Figs. 3 and 4, rear and front elevations respectively of the machine shown in Figs. 1 and 2.

In the embodiment of the invention herein selected for illustration the frame-work (Fig. 2) comprises a standard or column A, having at its upper end a head or bed A'. This head A' supports the swinging frame B, adapted to beat down the work and carries suitably mounted or supported thereon the drive shaft 70 and wire feeding, cutting and nailing mechanisms. This drive shaft (see Figs. 1, 2 and 3) is provided adjacent its rear end with a suitable clutch, comprising fixed and movable members 1 and 2, the conical face or surface 4 of a recess formed in the front face of the movable member or pulley 2 being formed and adapted to engage a rearwardly projecting conical face 3 of the fixed member 1. Radial springs 5 interposed between the rear face of said fixed member and a ring or collar 6, secured to the inner hub 7 of said movable member act to hold the movable member normally outward or disengaged from said fixed member.

To slide the movable member into and out of engagement with the fixed member of the clutch, a loose collar 8 mounted on the drive shaft to bear against the rear face of said movable member is provided with wedge faces 9 engaging coöperating wedge faces 10 formed upon a vertically sliding wedge bar 11, which is provided with a vertical slot 12 to embrace said drive shaft and collar and provide for such sliding. Said wedge bar is also mounted to slide in a guide 13, the stem 14 of which is secured in a rearwardly projecting boss 15 of the head A' and a coil spring 16 surrounding said wedge bar and interposed between a split collar 17, adjustably clamped thereon, and said guide, normally holds said wedge bar depressed and the clutch members disengaged. A treadle rod 18 is connected to the lower end of said wedge bar by a usual adjustable screw coupling 19 and at its lower end to a treadle (not shown), the depression of the latter acting to elevate the wedge bar and slide the loose collar and movable clutch member inwardly to cause its conical face to engage that of the fixed clutch member and rotate the drive shaft in a manner common to clutches of this type.

Figure 1:
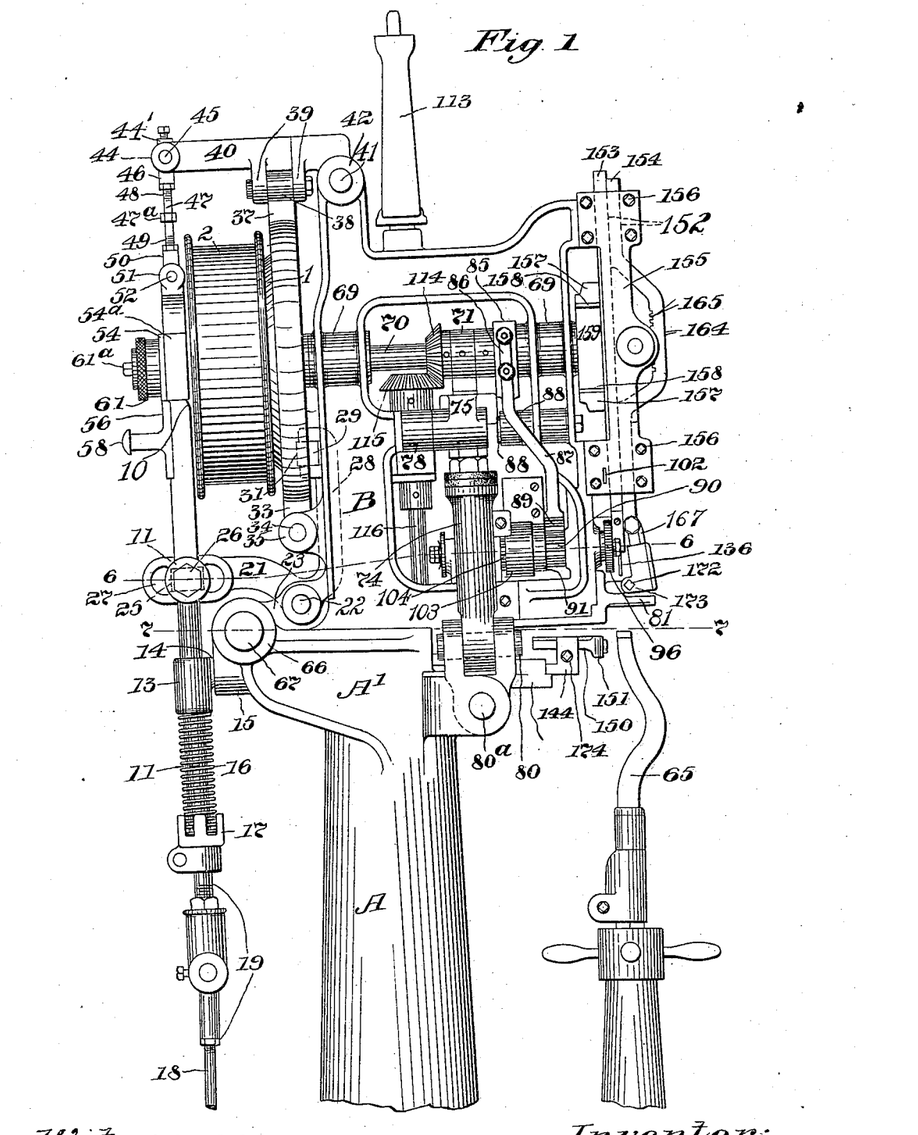
—Figure 1 is an elevation of the left side of a machine selected for illustration, the lower part of the standard being omitted.
Figure 6:
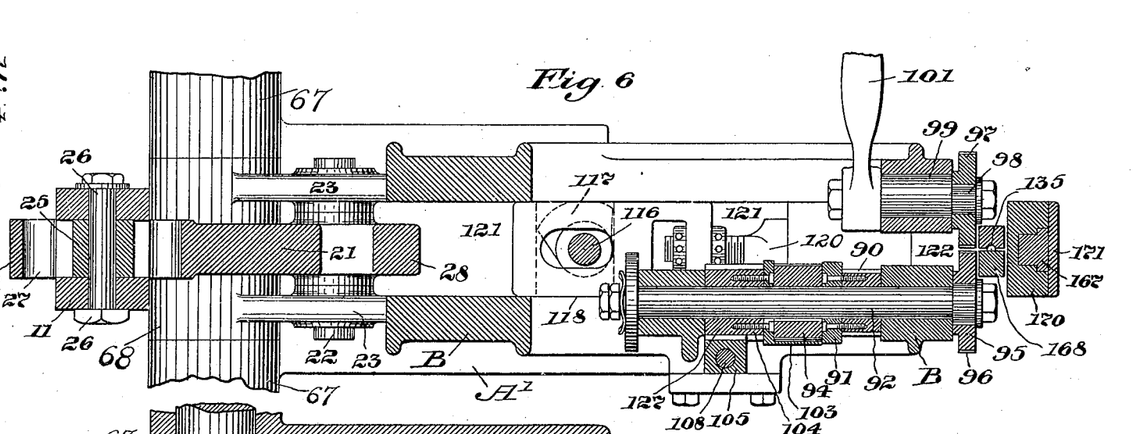
Fig. 6, an enlarged horizontal section on line 6—6, Fig. 1.
Figure 7:
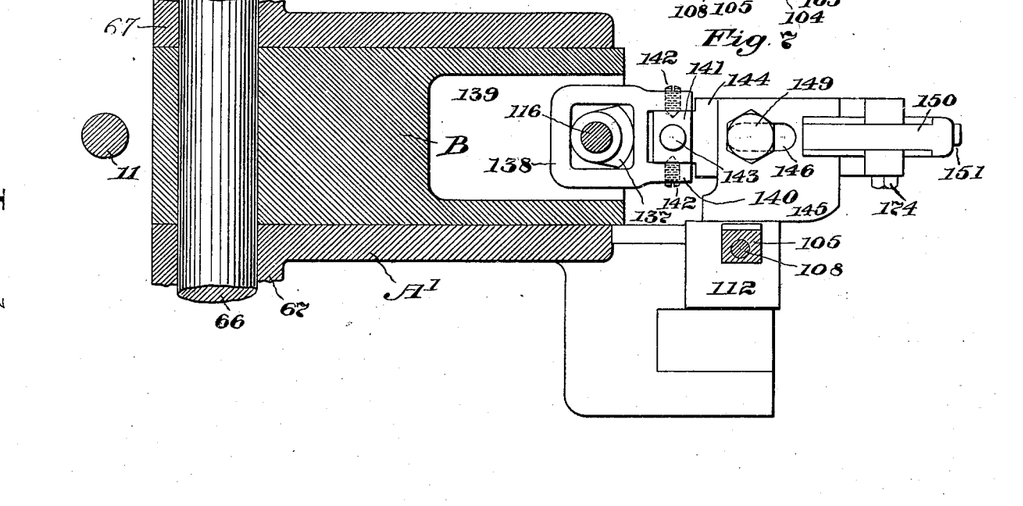
Fig. 7, a similar view taken on line 7—7, Fig. 1.

In order to prevent stopping the machine before the completion of a rotation of the drive shaft and to cause it to stop at a predetermined point of its rotation, a vertical arm 28 of a bell crank 21 carries a roller or other stud 29, shown by dotted lines in Fig. 1 running upon the bottom or cam surface of an annular groove 30 (Fig. 2) in the fixed clutch member 1. This surface is provided with a recess or portion 31 of greater depth (Figs. 1 and 4) to enable said roller 29 to enter said recess. Immediately above said guide the wedge bar has a vertical slot 20 to receive the horizontal arm of said bell crank 21, which is pivoted (see Figs. 1 and 6) by the cross pin 22 between the vertical ears 23 projecting upward from the boss 15. Within said slot is a block 25 pivoted upon a cross pin 26, said block entering and sliding in a horizontal slot 27 formed in the outer end of said bell crank 21 to enable said bell crank to rock or swing vertically in elevating or depressing the wedge bar. When the roller 29, or the bell crank arm which carries it, is enabled to swing rearwardly into said recessed portion 31 of the cam groove 30, or toward the fixed member of the clutch, the outer end of the bell crank is depressed. Said bell crank end, being connected to the wedge bar, is constantly under the tension of the wedge spring 16, which normally acts to depress said bar and arm whenever the cam roller reaches a position opposite the recessed portion 31 of said cam. This recess 31, however, is of short length, the greater portion of the cam surface being at a uniform depth to prevent the cam roller running thereon from moving inwardly, which of course prevents a depression of the bell crank and wedge bar, through the tension of its spring the moment the treadle is released. When, however, the recess is opposite the roller, the release of the treadle permits releasing the clutch so that the fixed member stops rotating with the recess in its cam surface in engagement with the cam roller, said recess being positioned to correspond to a predetermined point of the rotation of the drive shaft. As hereinafter referred to, the driver and awl are partially elevated in this position of the drive shaft. By this arrangement it is only possible to stop the machine with the awl and driver in the positions stated, it being impossible to stop the machine in any other position.

Figure 2:
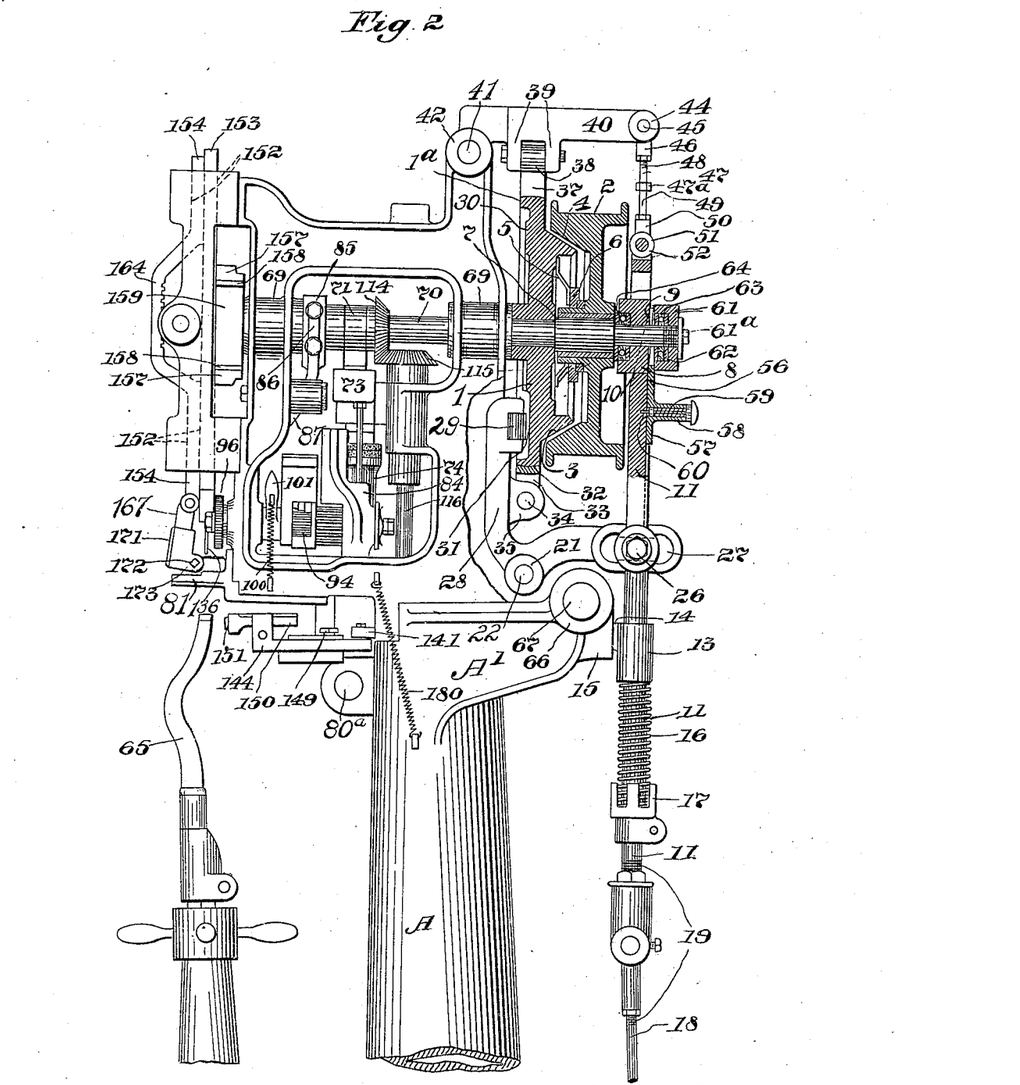
Fig. 2, a similar view of the opposite side of the machine showing the clutch mechanism in section.

To positively stop the rotation of the drive shaft and the fixed clutch member 1, the periphery (Fig. 2) of the latter, or a brake wheel formed on said member, is embraced by a spring band brake 32 having its hub or central portion 33 pivoted below and at one side of the drive shaft by means of the pivot pin 34 to outwardly projecting vertical brackets 35 on the head B. On the opposite side of said drive shaft (see Figs. 1, 3, and 16) the free ends 36 of said brake band are extended radially upward and tapered to produce wedge-shaped faces 37 received between a pair of actuating rollers 38, horizontally mounted between depending ears 39 of a horizontal lever 40, which is pivoted by a cross pin 41, between rearwardly projecting vertical ears 42 formed on the upper part of the frame B (Figs. 1 and 2). This arrangement permits the roller carrying lever 40 to be suitably oscillated to cause the rollers to roll upon the wedge faced brake ends and force them together when the lever and rollers are depressed, the elasticity of the spring band brake separating its ends when the lever and its rollers are swung upwardly. The forcing of said ends together causes the band to frictionally engage the brake wheel to stop its rotation and to effect this result simultaneously or immediately following the release of the clutch, said lever is connected to and actuated by the movement of the wedge bar. In order to suitably connect this roller carrying lever 40 (Figs. 1, 2 and 3) to the wedge bar, it is provided with a yoke formed with tubular bearings or ears 44 to receive between them a short sleeve 44′, pivoted thereto by a cross or horizontal pivot pin, 45. This sleeve has a right angular tubular projection, 46, threaded internally for adjustable connection with the adjusting link, 47. The latter having left and right screw threads 48 and 49 at the opposite ends to engage the threaded tubular projection of said sleeve 44 and a similar projection 50 of a sleeve 51. The latter sleeve, 51, is pivotally connected by the cross pin or bolt 52, between vertical ears, 53, formed at the upper end of the wedge bar, 11. Intermediate its ends the link 47 has a boss 47$^a$, formed to facilitate the application of a wrench thereto for adjusting purposes. By this connection the roller carrying lever is actuated simultaneously with or immediately following the operation of the clutch, applying the brake in stopping the machine and vice versa.

To enable the machine to be turned over by hand for adjusting or inspecting the various movements or parts thereof, I have provided a vertical slide or locking plate, 57, for throwing the clutch and its actuating mechanism, into and out of operative engagement, so that the depression of the treadle will not move the movable member of said clutch sufficiently to engage with the fixed member to rotate the shaft.

Figures 3, 4, 16:
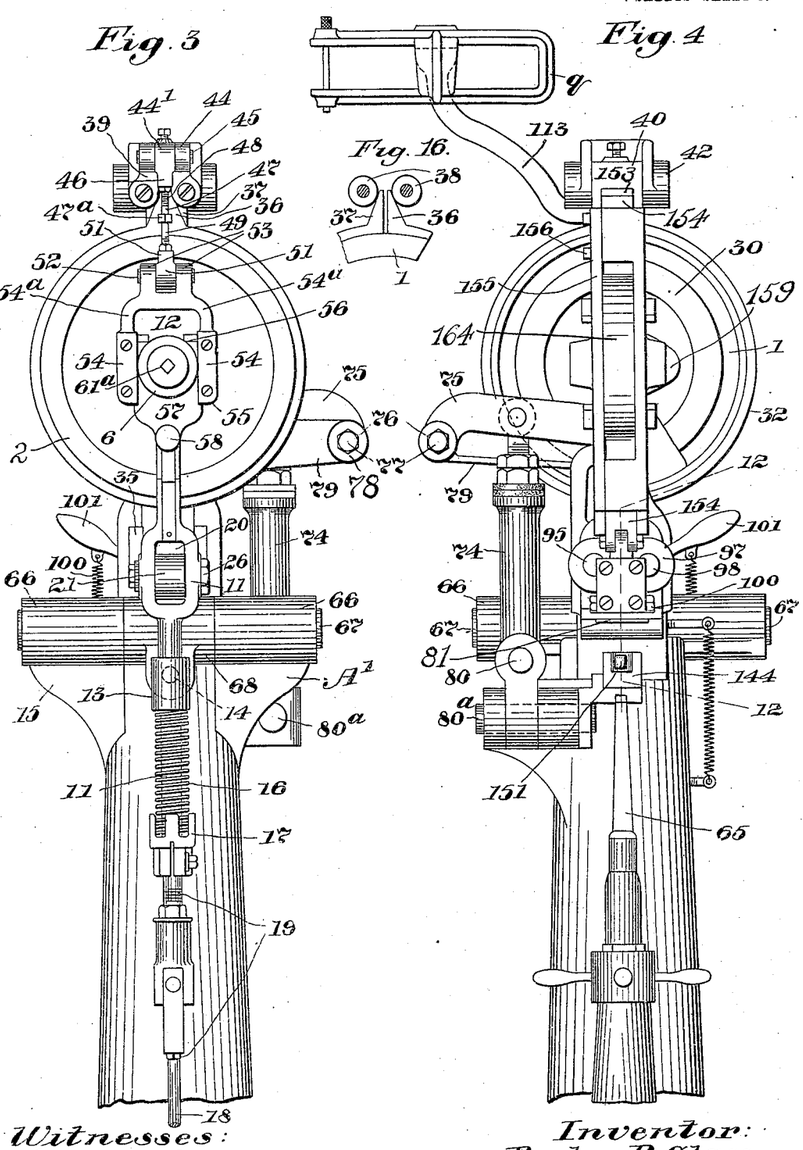

The rear face of the wedge block is faced with plates, 54, secured to the walls 54ª, Fig. 3, said plates having depending ends, 55, somewhat offset and grooved to receive the tapering sides and ends, 56, of said sliding plate, 57, which is provided with a vertical recess to embrace said drive-shaft. This sliding plate has an operating handle, 58, carrying a spring controlled locking pin, 59, to engage a notch, 60, in the wedge block, to hold said plate in its elevated position. To provide suitable bearing faces, a collar, 61, adjustably mounted on the rear end of the drive-shaft, is recessed to receive flat hardened steel rings, 62, and a brass ball containing ring, 63, constituting one form of ball bearing. The ring adjacent the front face of said collar bears against the sliding plate, 57, when the latter is in its upper position, but when said plate is slid down by means of its handle, after disengaging the locking pin, the tension of the spring, 5, acts to throw the pulley 2 and the wedge block sufficiently rearward on the drive-shaft to prevent the elevation of the wedge block from sliding the loose collar, 8, and movable clutch member, 2, far enough inward to engage the fixed member of the clutch, so that the drive-shaft is not rotated when the treadle is depressed. The surface of said collar, 61, is milled to facilitate screwing it inwardly or outwardly on said drive-shaft to compensate for wear of the bearing surfaces and it is clamped in any desired adjustment by a locking nut, 61ª. The front face of the loose collar, 9, already referred to, is also provided with a ball bearing of the same construction as that in the outer collar, 61, the front ring, 64, of which bears against the rear hub of the movable clutch member.

The column or standard constituting a support for the frame B and the mechanism carried thereby is provided with a horn 65 which, while it is pivotally and adjustably mounted to vary its distance from the normal position of the frame B, presently described, is otherwise stationary and is not depressed or otherwise oscillated as is common with this class of machines.

The frame B which is adapted to beat down the work is suitably pivoted to the head or bed, A', by means of tubular bearings 66, (Figs. 1 to 4 and 7) formed thereon, to receive a suitable ear or hub, 68, of the frame B, and a stud or pin 67. This frame, which I denominate as a hinged or oscillatory frame, is formed to provide suitable supports for the operative parts of my machine, and is provided with horizontal bearings, 69, (Figs. 1 to 3) for the horizontal drive-shaft 70. For oscillating the frame B, to beat down the work and for clamping it as the fastenings are driven and clenched, said drive-shaft is provided with a cam hub, 71, (see Figs. 1, 2, 5, and 8) the operating face, 72, of which is adapted to bear upon the long arm of a horizontal lever 73, Fig. 8, pivotally mounted upon a vertical tubular support, 74, carried by the bed A'. The other or short arm, 75, of said horizontal lever 73, (Figs. 3 and 4) is provided with tubular bearings or ears, 76, for a cross pin, 77, by which it is pivoted to a hub 78, Fig. 1, formed upon a horizontally projecting arm 79, of the oscillatory frame B. Rotation of said shaft 70 causes the cam 72 thereon to act upon the long arm of the lever, 73, to lift said cam and the frame B, and then drop it into its lowermost position or upon the work if the latter be in position beneath. By reference to Fig. 8 it is readily seen, by those skilled in the art, that when the cam 72 rotates it bears downwardly upon the lever end 73, and, turning the lever about its fulcrum, raises the outer end 75 (Figs. 3 and 4). The upward movement of the lever end 75 carries with it the projecting arm 79, and, as this arm is rigid with the frame B, said frame is lifted about its fulcrum 67. In raising the frame B the coil spring 180 (Fig. 2), attached at its ends to the column A and the frame B, is stretched, and as soon as the rotation of the cam 72 allows, this spring aids the weight of the frame B to bring it down upon the work. As the frame B descends the arm 79 is also carried down and lever end 73 is raised into position to again be engaged by the cam 72 for lifting the frame B. This lifting and dropping or oscillation of the frame occurs at every rotation of the shaft 70.

Since the frame B, swings or oscillates vertically about a fixed point on the head A', and the lever 73, about a fixed pivot on said swinging frame B, the tubular support 74, referred to, is mounted on the head A', by a gimbal or universal joint, comprising the pivoted joints 80 and 80ª (Figs. 1 and 8) to enable it to move forward and back and transversely thereto, and at the same time serve as a stationary support for the lever 73. By thus providing an oscillatory head I am enabled to secure an effective beating down of the work interposed between the horn 65, and a foot plate 81, formed on said head and to hold the work thus beaten down together till the completion of the nailing operation including the clenching of the nails, to permanently hold the work together.

Figure 5:
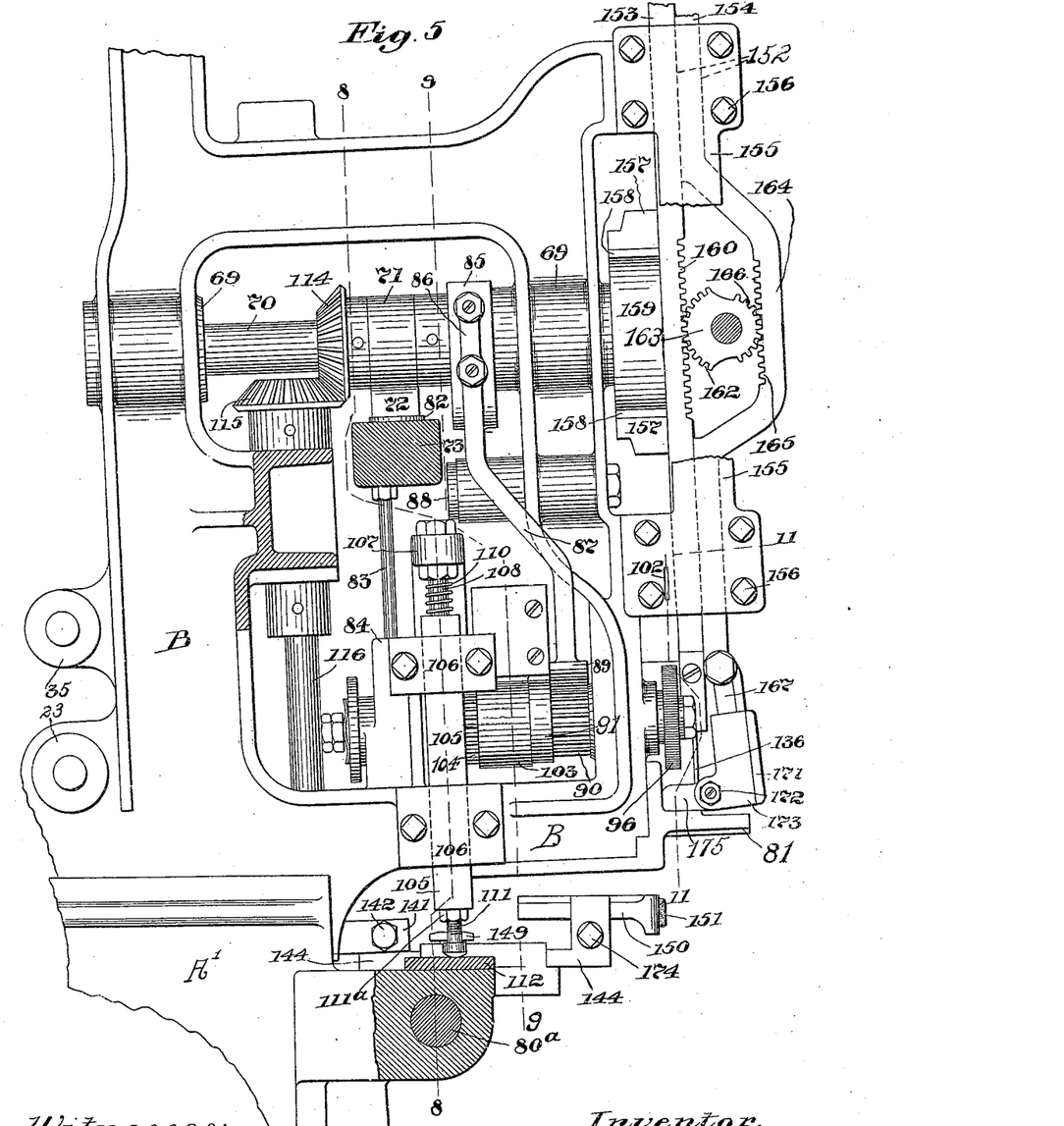
Fig. 5, an enlarged view of the swinging frame shown in Fig. 1.
Figures 8, 9:
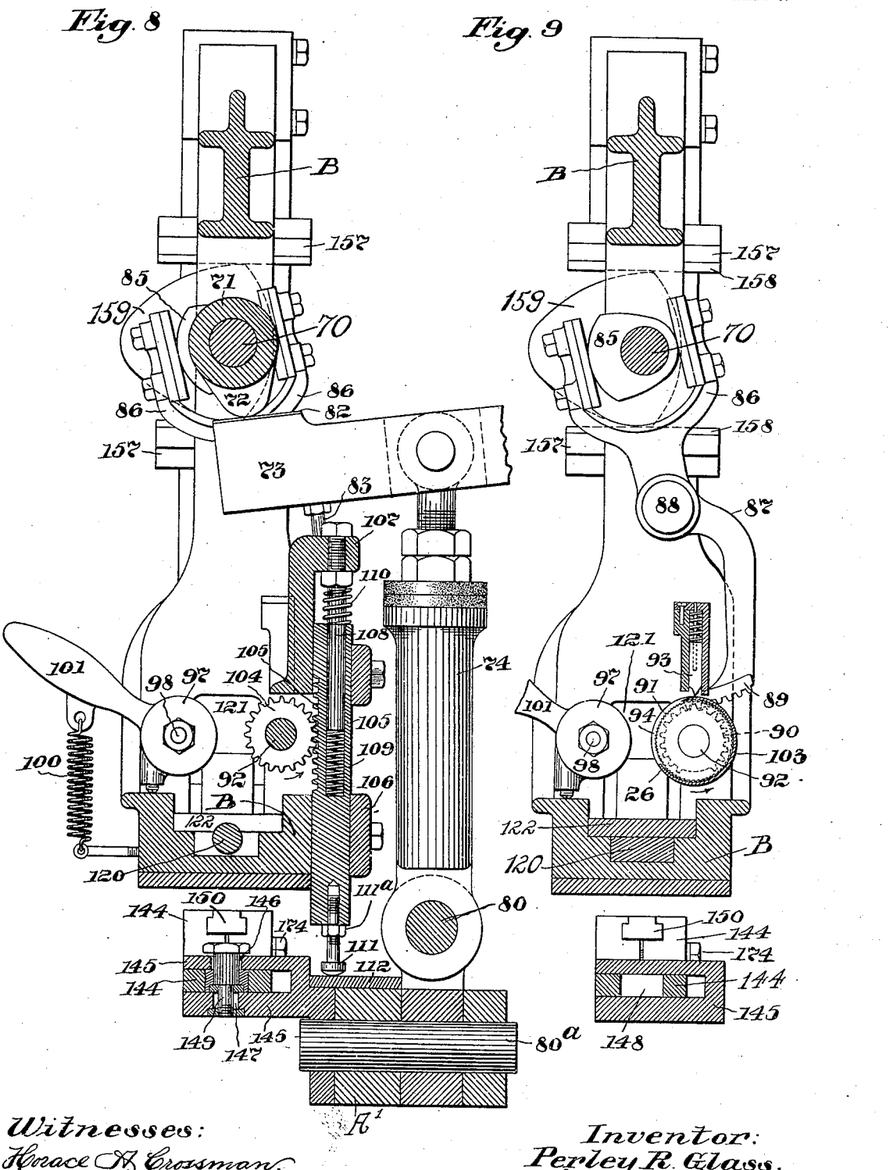
Fig. 8, a vertical section looking from the rear, taken on the line 8—8, Fig. 5, to show details of the automatic feeding mechanism.
Fig. 9, a similar section on line 9—9, Fig. 5.

To reduce wearing of the cam actuated end of the lever, 73, it is provided with a hardened steel bearing plate 82, (Fig. 5), and for overcoming the momentum of the frame B in its oscillations, a stop rod, 83, Figs. 5 and 8, is provided, shown as depending from the inner end of said lever 73, and which is adapted to strike in its descent, an opposed arm or bearing 84, of the frame B.

To actuate the wire feeding mechanism, the drive-shaft is provided with a cam 85, (Figs. 8 and 9) embraced by the yoked end 86, of an oscillatory lever 87. This lever is pivoted upon a stud 88, (Fig. 5) of the frame B, and its lower end is shaped to provide a segmental rack 89, (Figs. 5 and 9) engaging suitable teeth 90, formed on a pawl carrying sleeve 91, (Figs. 1, 6, 9 and 12) which is loosely mounted upon a feeding shaft 92, journaled in the frame B. This sleeve is provided with spring pressed pawls, 93, (see Figs. 9 and 12) engaging a ratchet wheel, 94, fast upon said shaft. In the operation of the machine the pawl carrying sleeve is forced to swing back and forth by the cam actuated movement of the segmental rack, and the pawls engaging the ratchet cause an intermittent rotation of the feeding shaft. To the front end of this shaft is secured a feeding wheel 95, having a milled or serrated periphery 96, (Fig. 1). Similarly placed on the opposite side of the machine is a similar feeding or presser wheel 97, (Fig. 6), loosely mounted upon a cylindrical projection or stud 98, eccentrically mounted upon a spindle 99, in bearings of said frame B.

The eccentric stud spindle is provided with a handle, 101 by which to turn its spindle and, through its said eccentric stud, cause the feed wheels to be separated or closed as desired, and to retain them normally closed in feeding relation to each other, I have connected said handle, 101, with the frame by a coil spring, 100, which tends constantly to turn said handle and spindle in a direction to move said feed or pressure wheel into engagement with or against the other wheel, 96.

To automatically provide nails of different length adapted to the varied thickness of the sole or stock, for the time being on the horn, or to adjust the feed to cut nails of any desired length, I provide efficient adjusting means to vary the length of wire feeding. To that end, the ratchet wheel, 94, is partially surrounded by a semi-cylindrical shield, 103, Figs. 6 and 9, which is adapted to slide between said ratchet, 94, and the pawls 93. This shield projects laterally from a pinion, 104, (Fig. 6) loosely mounted on the feeding shaft adjacent the ratchet, and is actuated by a rack bar, 105, mounted to slide vertically, see Fig. 8, in bearings 106, formed in the frame B. A projection 107, from said frame supports a guide-rod 108, (see Figs. 5 and 8,) slidably mounted in a vertical bore of the rack bar and coil springs 109, 110, interposed between the bottom of the bore and the guide rod, and encircling the guide rod between the bar and the projection respectively, act to force the lower end of this bar to bear constantly upon the head A' during the oscillations of the frame.

In the oscillations of the frame B, the downward motion thereof, through the stationary rack 105, causes the pinion 104 and its attached shield to turn in the direction indicated by the arrows on Figs. 8 and 9, to cover more or less of the teeth of the ratchet wheel, 94, over which the pawls move and the cam 85 is so positioned or timed on the shaft 70, as to cause the pawls to swing inwardly on their operative stroke, simultaneously or immediately following the partial rotation or movement of the shield. The pawls are arranged to move freely over the ratchet teeth in one direction but in the other direction engage the same to turn the feeding shaft and its feeding wheels, so as to feed wire down through the guides 102 from the reel, $q$, supported by the frame standard, 113. The shield, according to its position, varies the number of teeth passed over by the pawls before they operatively engage those at the end of the shield to rotate the shaft, thus varying the arc through which the ratchet and feeding wheels turn, and consequently the length of wire fed down by them through their rotation. A bolt or screw 111, (see Figs. 5 and 8) having a lock nut 111$^a$ is adjustably mounted in the lower end of the rack bar 105 to rest upon a bearing plate 112, secured to the head A'. This adjusting bolt 111, may be turned to move the rack bar up or down and turn the shield on the ratchet to vary the position of the arc through which said shield oscillates during the relative reciprocation of the rack bar 105, or the direct oscillations of the frame B. This arrangement provides a very efficient and simple means of feeding the wire any desired amount, and of course securing thereby nails of the same length by means presently to be described. It will further be apparent that if stock be interposed on the horn of such thickness as to check the forward swing of the head B, the reciprocations of the bar and the movement of the shield will be correspondingly reduced, to uncover more ratchet teeth to be engaged by the pawls causing said ratchet to rotate through a greater arc and the feeding wheels to feed forward more wire to the cutter now to be described.

To efficiently supply means for cutting and forming nails from the wire fed down by the feeding mechanism, I have provided a pair of removable lower and upper die cutters, 123, 128, (Fig. 15) the former being carried at the front end of a reciprocatory bar 120, (Figs. 12 and 13) threaded at its rear end for adjustable connection with a bearing box, 118, within which rotates the cutter actuating cam 117, fast upon the spindle 116. This spindle is mounted in the frame B and is rotated by means of a beveled wheel or pinion, 115, (Figs. 1, 2 and 5) secured upon its upper end in engagement with a beveled wheel or pinion, 114, formed upon or connected with the cam 71 of the drive-shaft.

The upper cutter, 128, is stationary and is received within a shouldered vertical recess, 127, (Fig. 11) formed at the base of a lower wire guide, 125. A locking plate, 129, to retain said cutter in position is secured to said guide by screws 130 which upon removal permits the cutter to be taken out. Said wire guide comprises a block secured to the frame B immediately below and between the feeding wheels and it is provided with a vertical channel, 126, to receive and guide the wire received from the said wheels into the alined cylindrical vertical channels 124, 128ª, in the lower and upper die cutters respectively.

The frame B at its under side, (Figs. 6 and 8) is provided with a longitudinal recess 121, to receive said box 118, said guide and cutters 123, 128, and for bearings 122 for the cutter bar, to enable it to be reciprocated back and forth therein by the rotation of the cam 117.

In order that the nail or other fastening to be cut shall be formed with suitable prongs to be separated on the horn to clench the fastening to the work, when driven therein, the lower face of the stationary cutter is provided with a very narrow V-shaped vertical groove 131, (Fig. 15) to receive the V-shaped projections or narrow tongues 132, formed on the upper face of the movable cutter, at the sides of its nail carrying vertical channel. In operation the cutter bar is moved forward by the rotation of its connected cam, from its normal wire receiving position shown by Fig. 12, to one directly under the driver, and over a perforation in the foot plate 81. The wire within the cutters is cut across by the shearing action of one cutter against the other, leaving the end of the wire that remains in the upper cutter pronged or forked to constitute the end of the next nail to be cut and driven, the opening formed between its prongs corresponding to the shape of the groove in the face of the cutter. The corresponding or lower end of the nail just severed and which remains in the movable cutter is of course similarly shaped while its upper end is pointed or tapered to correspond to the shape of the opening between the prongs of the end remaining on the upper cutter. The movable cutter after having thus severed and formed a nail, acts as a carrier for moving it into driving position by the forward movement of the cutter bar, whence I have denominated it a carrier cutter, said cutter also acting as a guide or nose to receive the driver when in its forward position.

At its forward and lower end the frame B is provided with the suitable horizontal foot plate, 81, projecting forwardly therefrom directly beneath the movable carrier cutter, 123, and which supports and guides the latter. The vertical perforation, 134, in this plate, permits the awl, 135, the nail or fastening, and driver, 136, to pass through into the work.

A work feeding bar, 150, (Figs. 7 to 9 and 12) is adjustably mounted by a clamp bolt, 174, in the outer end of an oscillatory or feeding bar carrier, 144, and is provided with a tip, 151, preferably of rubber, which is suitably supported therein. Said tip bears against the shoe mounted on the horn, and the oscillations of the feed bar, in the operation of the machine, feed and turn the heel of the shoe or other work to provide a desired uniform spacing of the nails, the operator only being required to steady the shoe or work on the horn. In order to secure suitable oscillations of this bar, I have provided the following mechanism. A cam, 137, (Figs. 7 and 12) is secured to the spindle, 116, and is also inclosed within a box, 138, which reciprocates within a recess, 139, in the head, B. The front side of said box 138, is provided with ears, 140, to receive a block, 141, pivoted thereto by screws, 142 (Figs. 5 and 7), said block being pivotally connected to a vertical pin, 143, on the inner end of the feed bar carrier, 144 (see Figs. 7 and 12). Said feed bar carrier is pivotally mounted to slide back and forth in a recessed guide or support, 145, secured to the head, A' (see Figs. 2, 4, 7, 8 and 12). The upper and lower walls of the guide are formed with longitudinal slots, 146, 147, and the carrier has a longitudinal slot, 148, to receive a stud, 149 carrying a fulcrum block (Figs. 8 and 9), which is adjustably secured therein at any point to enable the swing of the outer end of the carrier to be suitably regulated. The nailing mechanism is mounted or carried upon the oscillatory frame, B, the downward swing of which is also effective in driving and clenching the nails. Said nailing mechanism comprises suitable driver and awl bars, 153, 154, respectively, mounted in vertical channels or guides, 152 (Figs. 1, 2, and 5), formed at the front of said oscillatory frame, a face plate, 155, (Figs. 4 and 5) being secured by bolts 156, to hold them in place. The back of the driver bar is provided with fixed horizontal and rearwardly projecting blocks, 157, having suitable wearing plates, 158, bearing upon the opposite sides of a cam, 159, fast on the front end of the drive shaft. The rotation of this cam reciprocates the driver bar to enable the driver, 136, secured to its lower end, to drive the nails out of the carrier cutter through the opening in the foot plate into the sole or stock which has been beaten down by the oscillatory frame and held between said foot plate and the horn, the nails being clenched as the prongs are separated and clenched upon the work upon contacting with the stationary horn beneath. The driver bar is straight and intermediate its ends is provided with suitable teeth, 160 (see Fig. 5), forming a rack to engage the teeth, 162, of a segmental gear, 163, pivotally mounted between the sides of the face plate and frame, B. The ends of the awl bar are vertically arranged to bear and be guided between the driver bar and said guides, 152, but the intermediate portion, 164, is offset therefrom or bent outwardly and then parallel to form a rack, 165, to engage the teeth, 166, on the other side of the gear. Any motions of the driver bar cause simultaneous motions of the awl bar, but in opposite directions thereto.

Figures 10, 11, 12, 13, 14, 15:
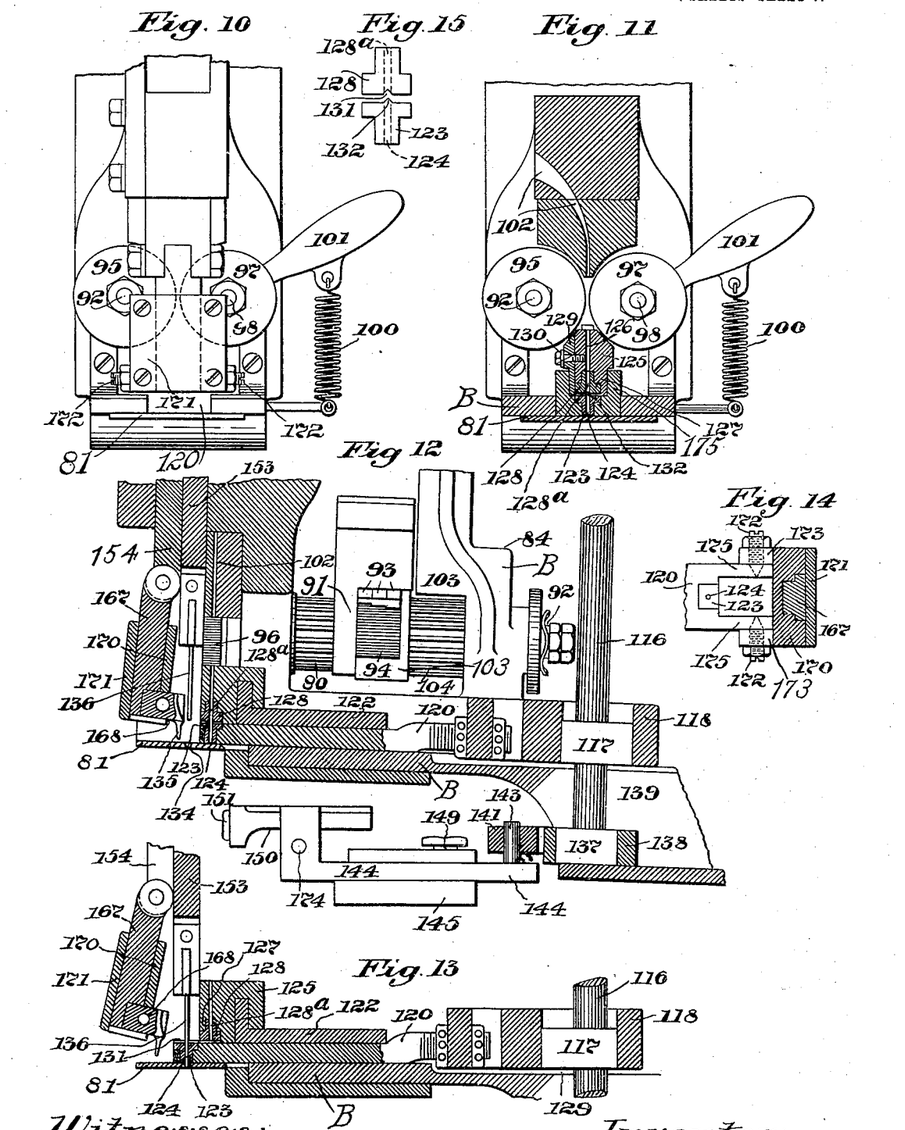
Fig. 10, an enlarged detail of the front of the machine, to show the feeding wheels, the pivoted end of the awl, and its guide.
Fig. 11, an enlarged vertical sectional detail taken on the line 11—11, Fig. 5.
Fig. 12, an enlarged sectional detail taken on line 12—12, Fig. 4, to show the cutter bar, awl and driver to which reference is hereinafter made.
Fig. 13, a detail of the same but with parts differently positioned.
Figs. 14 and 15, details of the cutter and its connection with the awl carrier; and, Fig. 16, a detail to show the radially extended ends of the spring band brake, Fig. 3.

To enable the awl, 135, to be moved back and forth from operative to inoperative position, so that after it has punched a hole in the stock it may be swung forward to make room for the descending driver, I have arranged the following mechanism. As herein shown (see Figs. 5, 12 and 13), the lower end of the awl bar forms a carrier, 167, pivoted to the main part thereof, said carrier having at its lower inner side a slitted angular projection, 168, in which the awl, 135, is clamped (see Figs. 12 and 13). This pivoted carrier, 167, is removably mounted to slide in a grooved guide or box, 170, Fig. 14, and is retained therein by means of the face plate, 171, secured to the sides of the guide by screws (Fig. 10). The guide is pivotally connected by its ears, 173, and by screws, 172, to the ears, 175, on the front end of the cutter bar between which the cutter is removably held (see Fig. 14). This connection causes the awl guide to swing inwardly as the carrier cutter returns to its wire receiving position on the back stroke of the cutter bar. While this movement is taking place the feeding bar moves the work laterally a desired spacing distance, as described; the driver bar is ascending and the awl bar descending to drive its awl through the perforation in the foot plate into the work or the heel seat of a sole. Immediately thereafter the awl is lifted, the carrier cutter moved forward to cut off a formed nail, is stopped with its wire channel alined or positioned over the perforation in the foot plate in the path of the descending driver, the nail being driven thereby into the awl hole just punched in the work.

To operate the machine, the work, say a shoe, is placed with the heel portion or counter of the upper bearing against the feed bar and with that portion of the heel seat at which it is desired to commence nailing directly beneath the perforation in the foot plate and in the path of the driver. The operator then depresses the treadle to elevate the wedge, release the brake and operate the clutch to start the machine. The rotation of the drive shaft automatically lifts itself and the frame, B, against the weight of said frame and the tension of the spring, 180, and the oscillation of the cam, 85, and the segmental rack, 89, causes the pawls to rotate the feeding wheels to feed down a length of wire through the passages 102 and 126 into the cutters to form a nail of suitable length. Simultaneously, the awl has been moved inwardly by the cutter bar and has pierced the heel seat. Immediately following, the awl is lifted and swung forward out of the path of the driver by the forward movement of the cutter, as a nail is cut off and formed. The further descent of the driver forces the nail into the awl hole in the heel seat and clenches it over the horn. The work feeding cam is so positioned or timed as to cause the work feeding bar to swing so as to feed the work along the proper distance immediately after the driver has driven and clenched the last nail, thus positioning the heel seat so that the next awl hole and nail driven therein shall be uniformly spaced from the last nail driven therein. The operator steadies the shoe as it is successively fed along by the repeated cycles of operations until the nailing is completed, when the operator releases the treadle, to stop the machine. This he can only do when the recess in the clutch cam opposes the cam roller, when the latter slides into said recess, thus permitting downward movement of the wedge to release the clutch and apply the brake, as described. The recess in the cam is so placed, however, that the machine will only stop when the awl and driver bars are at about half stroke, in which position the driver and awl are both sufficiently elevated, so as not to protrude or project below the foot plate. This enables the work to be readily removed from the horn and protects the awl and driver from injury.

What is claimed is:

1. In a nailing machine, awl and cutter bars, means for operating them, and connections between said bars to move one into inoperative position as the other is moved into its operative position, said connections being constructed and arranged to move one of said bars with greater speed than the other.

2. In a wire nailing machine, a driver, a reciprocatory bar, a nail carrier thereon having a channel therein provided with a cutting edge, a stationary cutter having a channel alined with that of the carrier when in its normal position, feeding mechanisms to supply wire thereto, an awl guide connected to the carrier, an awl, means for reciprocating the awl, and means for reciprocating the bar and its carrier to move the awl into and out of operative position, to cut the wire and to move the carrier out of and into the path of the driver.

3. In a nailing machine, a shaft, a driver bar and driver reciprocated thereby, an awl bar and its pivoted awl carrier, means intermediate said driver and awl bars for reciprocating the latter from the former, a carrier cutter having means for cutting and carrying a nail, a foot plate having a perforation to receive the awl, nail, and driver, connections between the awl carrier and said carrier cutter, and means for reciprocating the carrier cutter to cut and carry the nail to a position over the perforation of the foot plate in the path of the driver and to move the awl forward out of said path.

4. In a nailing machine, a foot plate having a nail orifice, a driver bar and driver, an awl bar and pivoted awl carrier having an awl, a shaft to reciprocate said driver bar, a gear intermediate the driver and awl bars to reciprocate said awl through said nail orifice into the stock, a movable nail cutter carrier adapted to coöperate with a fixed cutter, connections between the awl and movable cutter, and means for reciprocating said movable cutter to move the awl out of, and said carrier into, the path of said driver, to cause the nail cut and moved by the cutter carrier to be driven into the nail hole just punched by the awl.

5. In a nailing machine, a nose plate having a nail passage, an awl and a driver and means for passing them through said passage alternately, a nail presenter, and means governed by the movement of the nail presenter for removing one of said parts from alinement with the nail passage to permit the other to pass through.

6. In a nailing machine, an awl and a driver constructed and arranged to operate successively upon the same point in the work, a nail presenter, and means controlled by the movement of the nail presenter for moving one of said parts laterally with respect to the other.

7. In a nailing machine, a nail presenter provided with a guideway, an awl carrier in said guideway, an awl bar to which said carrier is articularly connected, and means to reciprocate said awl bar and nail presenter to give the awl carrier movement in two directions.

8. In a nailing machine the combination with an awl bar, awl and operating means therefor, of a nail presenter, operating means therefor, and connections between said bar and presenter whereby movement of the presenter imparts a lateral movement to the awl.

9. In a nailing machine a reciprocatory awl bar and awl, wire feeding mechanism, and means for simultaneously severing the wire and moving the awl laterally.

10. In a nailing machine an awl mounted for movement in two directions, wire severing means, means for moving the awl in one direction and means controlled by the severing means for moving it in the other direction.

In testimony whereof, I have signed my name to this specification, in the presence of two subscribing witnesses.

PERLEY R. GLASS.

Witnesses:
SIDNEY F. SMITH,
EVERETT S. EMERY.